United States Patent
Marcuz et al.

(10) Patent No.: US 6,264,458 B1
(45) Date of Patent: Jul. 24, 2001

(54) MOLD CLAMP

(75) Inventors: Darin A. Marcuz, Mississauga (CA); William J. Plsek, Friendswood, TX (US)

(73) Assignee: Decoma International Corp., Concord (CA)

( * ) Notice: Subject to any disclaimer, the term of this patent is extended or adjusted under 35 U.S.C. 154(b) by 0 days.

(21) Appl. No.: 09/252,742

(22) Filed: Feb. 19, 1999

Related U.S. Application Data

(60) Provisional application No. 60/075,417, filed on Feb. 20, 1998.

(51) Int. Cl.[7] .................................................. B29C 45/64
(52) U.S. Cl. ..................... 425/451.9; 292/256; 292/257; 425/595; 425/DIG. 5
(58) Field of Search ............................... 425/595, 451.9, 425/DIG. 5; 292/256, 257

(56) References Cited

U.S. PATENT DOCUMENTS

| | | |
|---|---|---|
| Re. 33,248 | 7/1990 | Schad . |
| 1,948,799 | 2/1934 | Oyster . |
| 2,776,854 | 1/1957 | Billstrom . |
| 3,199,159 | 8/1965 | Wernecke . |
| 3,345,691 | 10/1967 | Aoki . |
| 3,482,830 | 12/1969 | Sendoykas . |
| 3,734,661 | 5/1973 | Joly-Pottuz et al. . |
| 4,365,792 | 12/1982 | Johns . |
| 5,104,308 | 4/1992 | Morton et al. . |

FOREIGN PATENT DOCUMENTS

| | | |
|---|---|---|
| 1297056 | 6/1969 | (DE) . |
| 2117534 | 10/1972 | (DE) . |
| 2455079 | 5/1975 | (DE) . |
| 1182892 | 3/1970 | (GB) . |
| 2073644 | 10/1981 | (GB) . |
| 57-167238 | 10/1982 | (JP) . |

*Primary Examiner*—James P. Mackey

(57) ABSTRACT

A mold clamp has a drive pivotally mounted on a first mold half. The drive includes a cylinder body and a piston, wherein one of the cylinder body or the piston is pivotally mounted to the first mold half and the other has a pair of pins and a locking plate having an engagement face. A guide directs the drive between a retracted position and an extended position. The guide has a pair of spaced apart guide plates mounted to the first mold half. Each guide plate has an arcuate slot slidably receiving the pins. An abutment is mounted on a second mold half. The abutment has a complementary engagement face for cooperating with the engagement face of the drive for enhancing engagement therebetween. When the drive is in the retracted position, the drive engages the abutment to apply a closing force between the first mold half and second mold half; when the drive is in the extended position, the drive is canted away from the first mold half allowing reciprocating relative motion between the first mold half and said second mold half.

6 Claims, 4 Drawing Sheets

MOLD CLAMP

RELATED APPLICATION

This application claims priority to and all the benefits of U.S. Provisional Patent Application Serial No. 60/075,417 filed on Feb. 20, 1998.

FIELD OF INVENTION

This invention relates to a clamp for a mold for effectively increasing the tonnage of a press. In particular, this invention relates to a simple yet effective device for retaining mold halves together during an injection process.

BACKGROUND OF INVENTION

Mold clamps are well known in the art. Typically, mold clamps have focused on clamping onto the drive cylinders of a press. The clamps will lock the drive cylinders in place to increase the effective tonnage of the press. However, these devices do not adequately address the problem of localized flashing.

SUMMARY OF THE INVENTION

The disadvantages of the prior art may be overcome by providing a mold clamp which can be mounted onto opposite halves of a mold which, in a locked condition, drivingly hold the mold halves together and, in an unlocked condition, swing out so as to not interfere with the opening and closing of the mold halves.

According to one aspect of the invention, there is provided a mold clamp having a drive pivotally mounted on a first mold half. The drive includes a cylinder body and a piston, wherein one of the cylinder body or the piston is pivotally mounted to the first mold half and the other has a pair of pins and a locking plate having an engagement face. A guide directs the drive between a retracted position and an extended position. The guide has a pair of spaced apart guide plates mounted to the first mold half. Each guide plate has an arcuate slot slidably receiving the pins. An abutment is mounted on a second mold half. The abutment has a complementary engagement face for cooperating with the engagement face of the drive for enhancing engagement therebetween. When the drive is in the retracted position, the drive engages the abutment to apply a closing force between the first mold half and second mold half; when the drive is in the extended position, the drive is canted away from the first mold half allowing reciprocating relative motion between the first mold half and the second mold half.

DESCRIPTION OF THE DRAWINGS

In drawings which illustrate embodiments of the invention.

DESCRIPTION OF THE INVENTION

Figure 1:
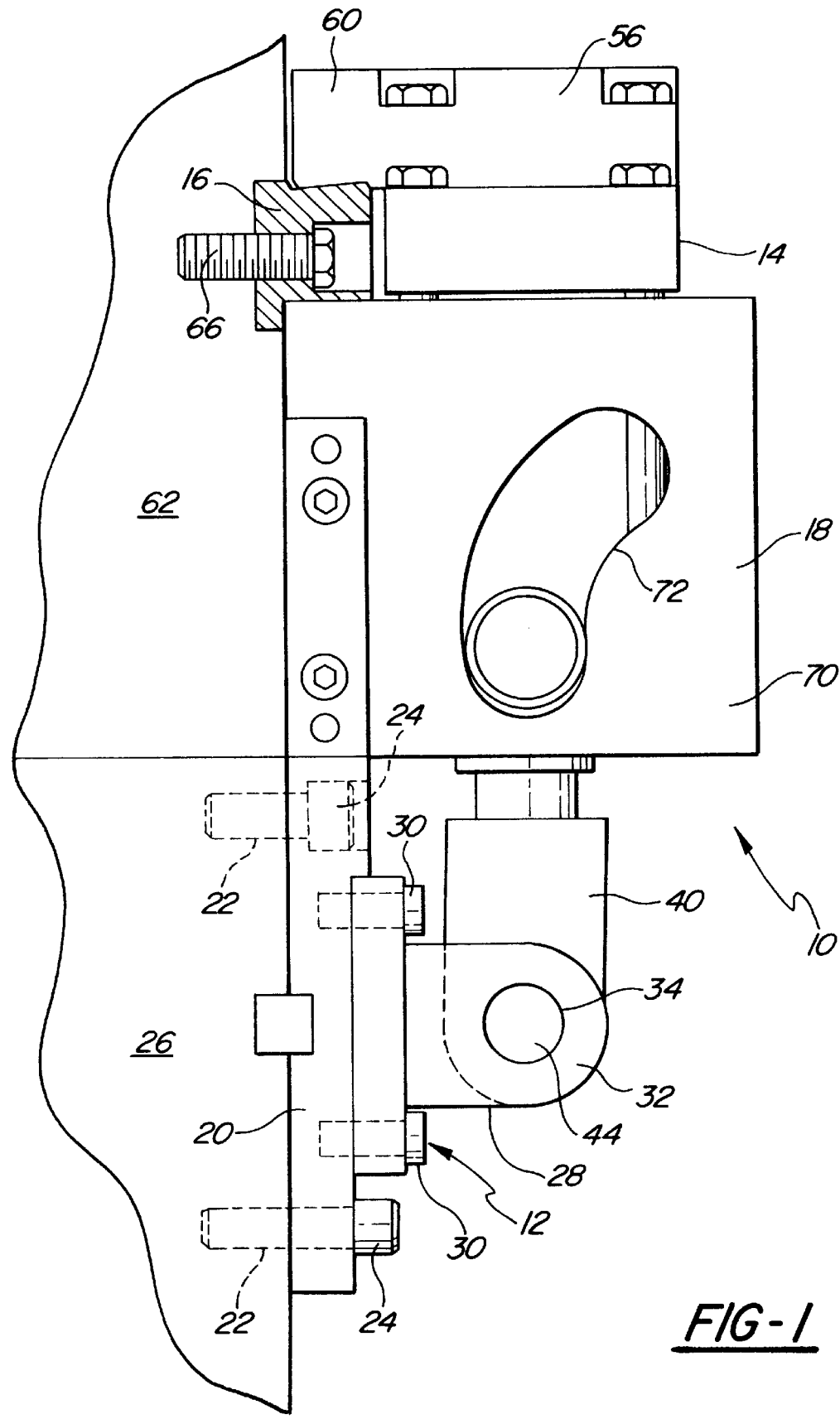
FIG. 1 is a side elevational view of a first embodiment of the mold clamp of the present invention in a locked condition.
Figure 2:
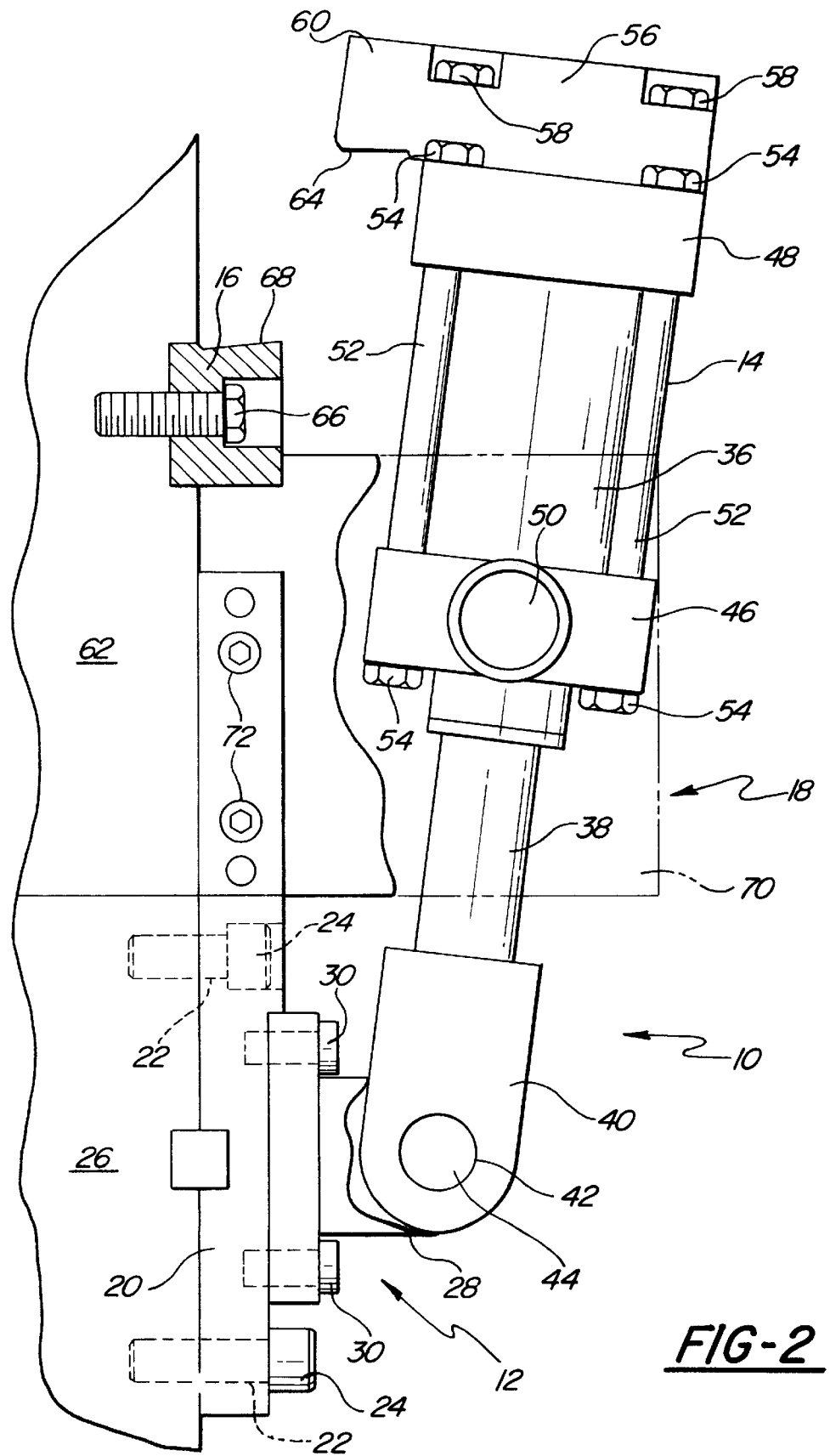
FIG. 2 is a partial side elevational view of the mold clamp of FIG. 1 in an open or unlocked condition.

Referring to FIGS. 1 and 2, a mold clamp 10 of the present invention is illustrated. Mold clamp 10 generally comprises a base 12, a drive 14, an abutment 16 and a or cam 18.

Base 12 has a mounting plate 20 having a plurality of through bores for receiving bolts 24 for mounting the base 12 onto one half 26 of the mold. Mounted on mounting plate 20 is a pivot mount 28. Pivot mount 28 is preferably bolted thereon by bolts 30. It is readily understood that other forms of attachment, such as welding, may also be used with suitable results. Pivot mount 28 has two spaced flanges 32 which extend substantially perpendicular to the mounting plate 20. Each flange has an axial bore 34 extending therethrough.

Drive 14 has a cylinder body 36 and a piston 38. Preferably, drive 14 is a commercially available hydraulic drive which can be integrated with the hydraulic system of the press. However, it is also contemplated that other types of drives, such as pneumatic and servo-motors, may also be used in the present invention.

Piston 38 has a pivot fitting 40 attached at the remote end of the piston 38. Pivot fitting 40 has a bore 42 sized to receive pin 44. Pin 44 extends through the bore 42 and axial bore 34 of the at a pivot point. In this manner, drive 14 is pivotally mounted.

Cylinder body 36 of the drive 14 has four spaced rods 52 which extend the length thereof. Cylinder body 36 has a collar 46 at a near end of the cylinder body 36. Collar 46 has a pair of diametrically opposed, outwardly extending guide pins 50. At the distal end of cylinder body 36 is collar 48. The rods 52 extend through the collars 46 and 48 and are secured thereto by nuts 54.

A locking plate 56 or first abutment 56 is secured to the distal end of the cylinder body 36 by rods 52 and nuts 58. Locking plate 56 has a tab 60 which extends towards the mold half 62. Face 64 is preferably angled relative to the parting line between the mold halves 26 and 62.

A second abutment 16 is mounted on mold half 62 by bolt 66. The second abutment 16 has an engagement face 68 which is also preferably angled relative to the parting line. To improve the attachment strength of the second abutment 16 to the mold half 62, the second abutment 16 may be countersunk into the end face of the mold half 62. The second abutment 16 is preferably has a length which is the same as the width of the first abutment locking plate 56.

Guide 18 or cam 18 has a pair of like guide plates 70 which are spaced apart a sufficient distance to receive drive 14 therebetween. Each face of guide plates 70 has an arcuate slot 72. Arcuate slots 72 receive and cooperate with pins 50 of drive 14 to guide the drive 14 during travel from a retracted condition (FIG. 1) to an extended condition (FIG. 2). In the retracted condition, drive 14 engages the second abutment 16 for drivingly locking the mold halves 26 and 62 together. In the extended condition, the drive 14 is canted away from the mold half 62 allowing free movement relative to the opposite mold half 26. The guide plates 70 and pins 50 act as a cam for facilitating the movement of the cylinder body 36 between the retracted and extended positions.

Guide plates 70 are mounted to the mold half 26. Bolts 72 firmly affix the guide plates 70 to the base plate 20.

At the start of a molding cycle, the mold halves 26 and 62 will be spaced apart. The drive 14 will be in an extended condition. Pin 50 will be at the distal end of guide slot 72. Guide 18 will cant the distal end of cylinder body 36 away from the mold half 62, allowing free movement of the mold half 62 relative to the other mold half 26. Once the mold halves have been closed by the main drive of the press, the hydraulic system for the mold clamp 10 is activated to retract the drive 14. As the drive 14 retracts, pins 50 will follow the guide slot 72, urging the distal end of the cylinder body 36 to move closer to the mold half 62 until the tab 60 or first abutment engages the second abutment 16. As is apparent, faces 64 and 68 complement each other to enhance engagement therebetween. A desired amount of pressure may be applied to the drive 14 to lock mold half 62 against mold half 26. At the end of the cycle, the hydraulic pressure of drive 14 is reversed to extend the drive 14. The cylinder body 36 will follow the path of the guide slot 72 to disengage the tab 60 from the second abutment 16 and simultaneously move away from the mold half 62. The mold half 62 may then be opened for removal of the molded or formed product.

The unique advantage of the present invention is that the relative size of the mold clamp 10 permits the mold clamp 10 to be mounted directly on the mold at specific locations where additional pressure is required. An application of the mold clamp 10 would be near a location where "flashing" or other pressure related defects are occurring. The additional pressure applied by the mold clamp 10 would minimize any material from seeping between the mold halves.

Further, any number of mold clamp units of the present invention may be mounted on the mold. Finally, the mold clamps 10 of the present invention may be retrofitted to existing molds.

Figure 3:
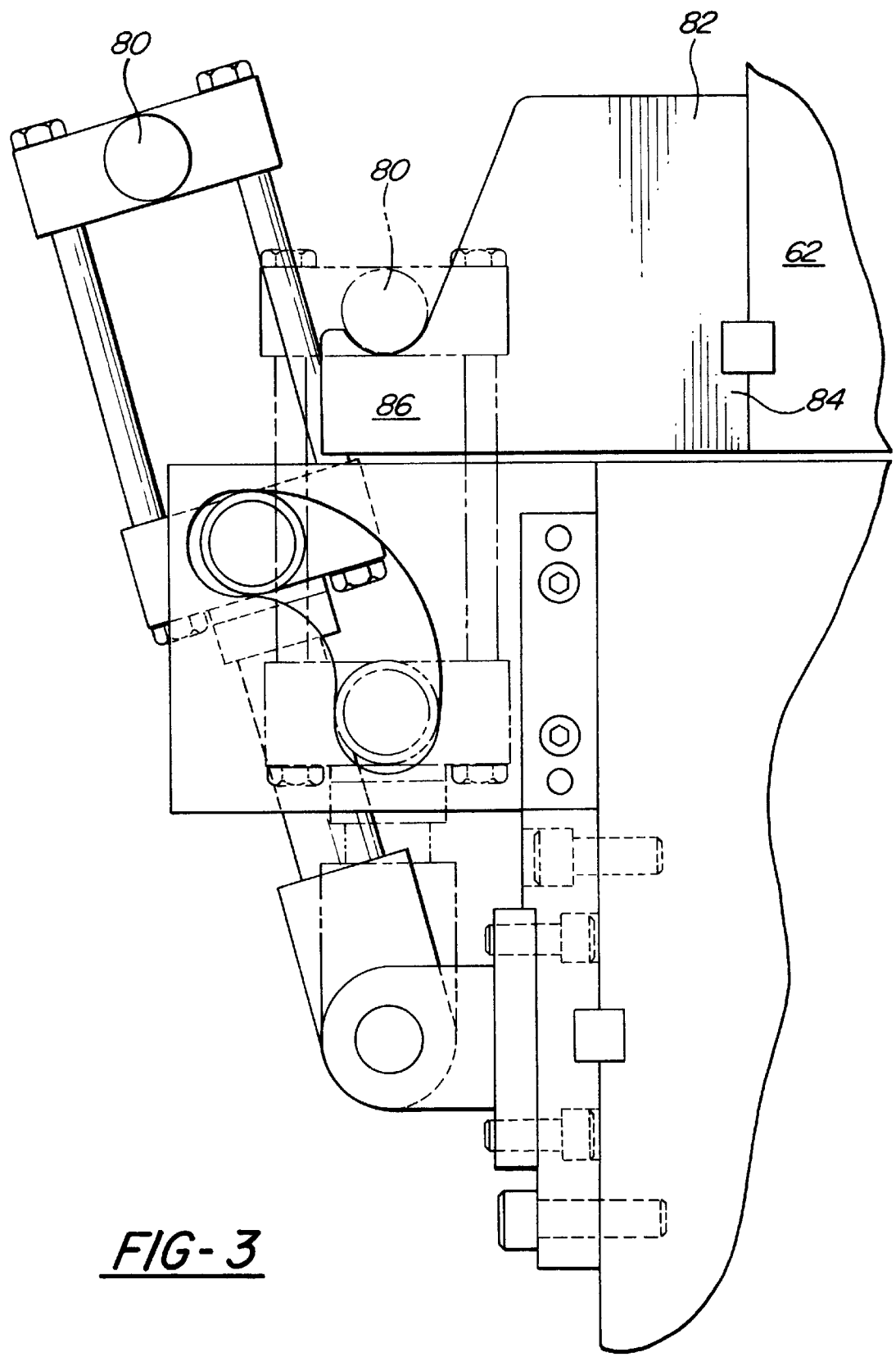
FIG. 3 is a side elevational view of a second embodiment of the present invention.
Figure 4:
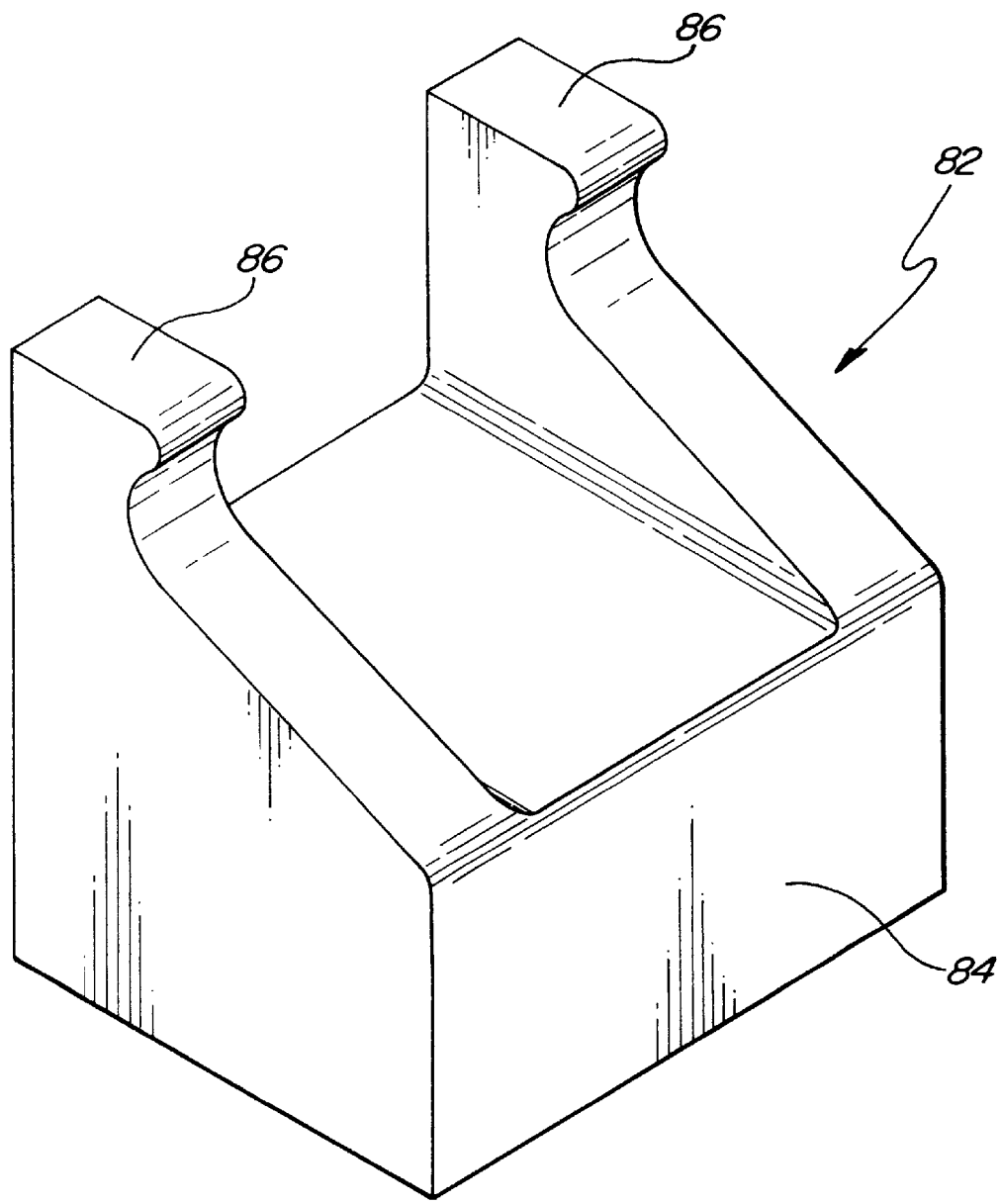
FIG. 4 is a perspective view of an abutment of the embodiment of FIG. 3.

Referring to FIGS. 3 and 4, a second embodiment of the present invention is illustrated. In the second embodiment the locking plate 58 is replaced with a different first abutment namely a pair of pins 80 mounted on collar 48. The second abutment 82 has a sturdy base 84 which mounted onto mold half 62. A pair of spaced hooks 86 extend from the base 84. In the second embodiment, the closing force of drive 14 is in line with the spaced hooks 86 of the second abutment 82 minimizing bending moments and long term fatigue on the locking mechanism.

The preceding specific embodiments are illustrative of the practice of the present invention. It is to be understood, however, that other expedients known or apparent to those skilled in the art or disclosed herein may be employed without departing from the spirit of the invention.

We claim:

1. A mold clamp comprising:

a base constructed and arranged to be mounted on a first mold half, a drive including a cylinder body and a piston with said piston pivotally mounted to said base about a pivot point, a first abutment constructed and arranged to be mounted to said cylinder body, a second abutment constructed and arranged to be mounted on a second mold half, and a cam arranged between said first abutment and said piston for rotating said cylinder body about said pivot point of said piston upon actuation of said drive to move said first abutment between a retracted position engaging said second abutment to apply a closing force between said first and second mold halves and an extended position with said first abutment canted away from said second abutment to allow reciprocating relative motion between said first and second mold halves.

2. A mold clamp as claimed in claim 1 wherein said first abutment has an engagement face and said second abutment has a complementary engagement face, said engagement faces cooperating to enhance engagement as said drive applies said closing force.

3. A mold clamp as claimed in claim 1 wherein said cam includes a pin mounted to and extending outwardly from said cylinder body.

4. A mold clamp as claimed in claim 3 wherein said cam further includes a guide plate mounted to said first mold half with said guide plate defining an arcuate slot and said pin riding within said arcuate slot to guide said cylinder body and said first abutment during said rotation of said cylinder body between said retracted and extended positions.

5. A mold clamp as claimed in claim 1 wherein said cam includes a pair of pins mounted to and extending outwardly from said cylinder body, and a pair of guide plates mounted to said first mold half with said guide plates defining a pair of cooperating arcuate slots and said pins riding within said arcuate slots to guide said cylinder body and said first abutment during said rotation of said cylinder body between said retracted and extended positions.

6. A mold clamp as claimed in claim 5 wherein said guide plates are mounted to said base of said first mold half.

* * * * *